US006546954B2

(12) United States Patent
Sato et al.

(10) Patent No.: US 6,546,954 B2
(45) Date of Patent: Apr. 15, 2003

(54) FLOW CONTROL VALVE

(75) Inventors: Masato Sato; Nobuharu Muto, both of Sashima-gun (JP)

(73) Assignee: Kyosan Denki Co. Ltd., Sowa-Machi (JP)

( * ) Notice: Subject to any disclaimer, the term of this patent is extended or adjusted under 35 U.S.C. 154(b) by 218 days.

(21) Appl. No.: 09/735,541

(22) Filed: Dec. 14, 2000

(65) Prior Publication Data

US 2001/0003991 A1 Jun. 21, 2001

(30) Foreign Application Priority Data

Dec. 21, 1999 (JP) .......................................... 11-362578

(51) Int. Cl.[7] ........................ F16K 31/365; F02M 33/00
(52) U.S. Cl. ........................ 137/496; 137/550; 123/519
(58) Field of Search ................................ 137/496, 550; 123/519, 520

(56) References Cited

U.S. PATENT DOCUMENTS 2,638,127 A * 5/1953 Griswold ................ 137/496 X
3,534,768 A * 10/1970 Powell ........................ 137/496
3,746,036 A * 7/1973 Bois et al. .................. 137/496
3,823,733 A * 7/1974 DuBois et al. .............. 137/496
4,241,756 A * 12/1980 Bennett et al. ............ 137/496
5,509,395 A 4/1996 Cook
5,564,466 A 10/1996 Kouichi et al.
5,878,725 A 3/1999 Osterbrink

OTHER PUBLICATIONS

1999 Subaru Legacy Service Manual 10, p. 17 "F:Pressure Control Solenoid Valve".

* cited by examiner

*Primary Examiner*—John Rivell
(74) *Attorney, Agent, or Firm*—Oliff & Berridge, PLC

(57) ABSTRACT

A flow control valve with a reduced number of parts and with few restrictions on installation space is provided. A back pressure chamber of a diaphragm-type valve body communicates with a communication port through a vent hole formed in a case of the flow control valve. An air filter is integrated with the flow control valve.

12 Claims, 6 Drawing Sheets

FLOW CONTROL VALVE

INCORPORATION BY REFERENCE

The disclosure of Japanese Patent Application 11-362578 filed on Dec. 21, 1999, including the specification, drawings and abstract is incorporated herein by reference in its entirety.

BACKGROUND OF THE INVENTION

1. Field of the Invention

The invention relates to an improvement in a valve for controlling reciprocating flow of a fluid and, more particularly, to a flow control valve effectively employed as a switching valve that discharges air in response to a rise in the internal pressure of a tank or during a refueling process and introduces fresh air in response to a fall in the internal pressure of the tank or during a purging process.

2. Description of Related Art

FIG. 5 is a system diagram of a breathing mechanism of a fuel tank for motor vehicles.

A fuel tank 1 is installed in a motor vehicle and provided with a breathing mechanism. When the internal pressure of the fuel tank 1 is high, the breathing mechanism operates such that fuel vapors in the fuel tank 1 are adsorbed by a canister 3 through a breather line 2 and escape to the outside through a vent line 4.

If the pressure in the fuel tank 1 falls, the breathing mechanism introduces outside air into the fuel tank 1 through the vent line 4 and the canister 3.

The vent line 4 is provided with a flow control valve 6 and a filter 7. The flow control valve 6 is designed as a diaphragm-type switching valve that opens in response to a rise in the pressure of the fuel tank 1 to discharge air to the outside and introduces outside air into the fuel tank 1 in response to a fall in the pressure of the fuel tank 1. The filter 7 removes dust from outside air and thus prevents the canister 3 and the valve from being stained.

FIG. 6 shows the cross-sectional structure of a flow control valve according to the related art.

The flow control valve 6 has a diaphragm-type valve body 11 and a valve port 12 opened and closed by the valve body 11. In addition, the flow control valve 6 has a communication port 13 leading to the side of outside air 8 and a communication port 14 leading to the side of the canister 3. The valve port 12 is formed at the end of the communication port 13 leading to the side of outside air 8. If the valve port 12 is opened, the communication port 13 and the communication port 14 thereby come into communication with each other. A check valve 15 is disposed between a communication port 20 leading to the side of the filter 7 and the communication port 14 leading to the side of the canister 3. The check valve 15 allows flow in a direction from the communication port 20 to the communication port 14 and prohibits flow in a direction from the communication 14 to the communication port 20.

A back pressure chamber 16 of the diaphragm-type valve body 11 communicates with outside air through a pipe portion 17 and a hose 18 and is capable of sucking and discharging air. The hose 18 extends downwards to prevent water from entering the back pressure chamber 16. In order to prevent dust from entering the back pressure chamber 16, the pipe portion 17 is provided with a dust filter 19.

In the flow control valve 6 shown in FIG. 6, the valve body 11 opens the valve port 12 in response to a rise in the pressure of the fuel tank 1.

Then fuel vapors in the fuel tank 1 enter the communication port 13 through the canister 3 and the communication port 14, so that it becomes possible to discharge air.

If the pressure in the fuel tank 1 falls, outside air reaches the communication port 14 through the air filter 7, the communication port 20 and the check valve 15, and is introduced into the fuel tank 1 through the canister 3.

In this manner, it becomes possible to suck and discharge air in response to a change in the internal pressure of the tank and introduce outside air when purging the canister.

Furthermore, the back pressure chamber 16 of the diaphragm-type valve body 11 operates smoothly only on condition that air be sucked and discharged in accordance with vertical movements of the valve body 11. Because outside air is introduced into the back pressure chamber 16 through the hose 18, the pipe portion 17 and the dust filter 19, no trouble is caused to the operation of the valve body 11.

However, since the flow control valve shown in FIG. 6 achieves introduction of air into the back pressure chamber 16 and prevention of water exposure by providing the hose 18 and the dust filter 19, the number of parts increases and the costs soar. Also, the height of the flow control valve increases, so that restrictions are imposed on installation space.

The structure wherein the air filter 7 is disposed separately from the flow control valve 6 also imposes some restrictions on installation space.

SUMMARY OF THE INVENTION

It is an object of the invention to provide a compact and light-weight flow control valve that imposes no restrictions on installation space and can be manufactured at low costs.

In order to achieve this object, one aspect of the invention is a flow control valve includes a diaphragm-type valve body, a valve port opened and closed by the valve body and a first port. The flow control valve also includes a second port coming into communication with the first port when the valve body is opened. A back pressure chamber of the valve body communicates with the first port through a vent hole formed in a case of the flow control valve.

According to the aforementioned aspect, since the air filter is integrated with the flow control valve, no restrictions are imposed on installation space.

Moreover, the reduced number of parts contributes to the reduction of costs.

The back pressure chamber of the valve body communicates with out side air through a vent hole formed in a case of the flow control valve.

DETAILED DESCRIPTION OF PREFERRED EMBODIMENTS

Hereinafter, embodiments of the invention will be described with reference to the drawings.

Figure 1:
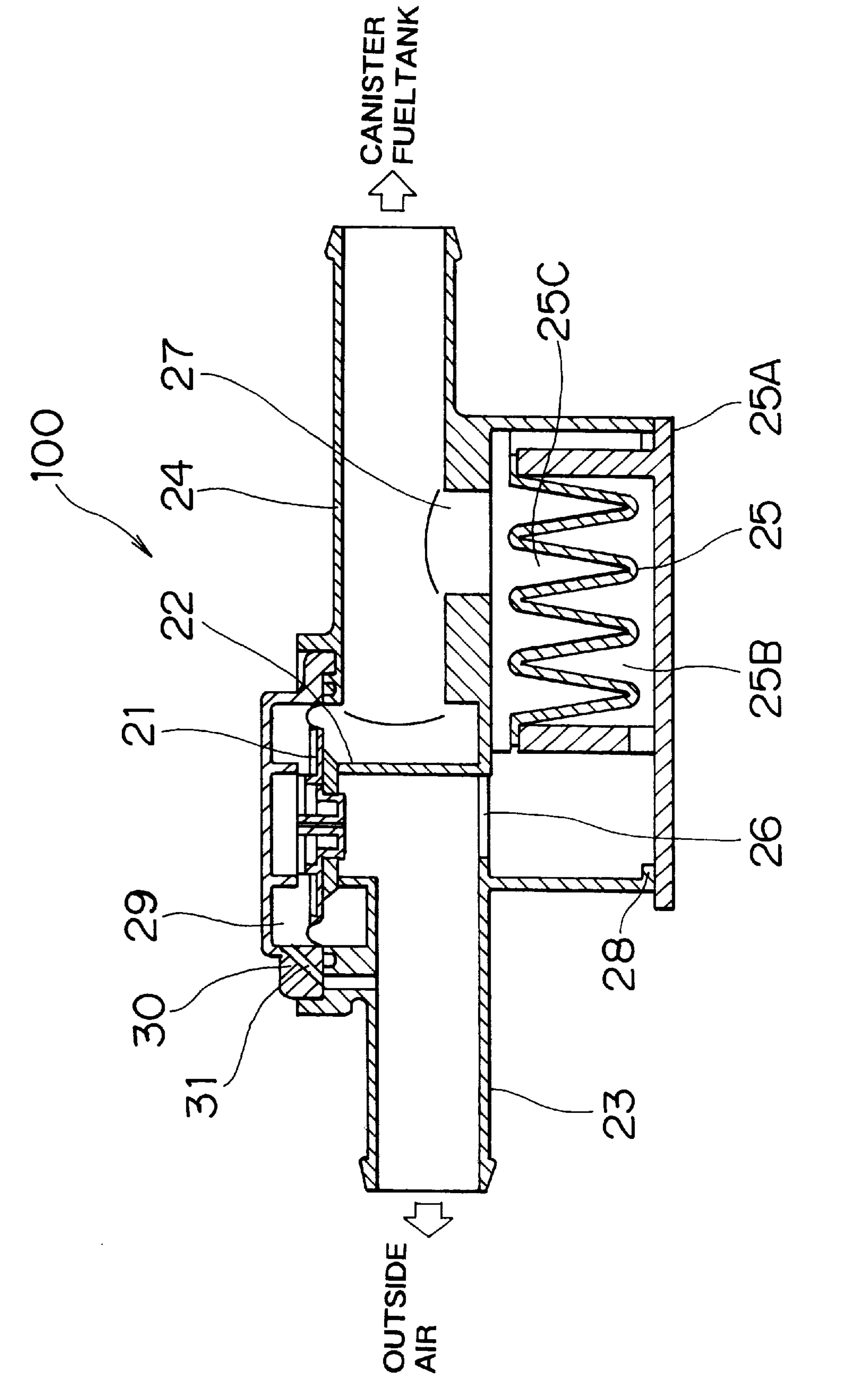
FIG. 1 is a cross-sectional view of a flow control valve according to a first embodiment of the invention.

First of all, a first embodiment of the invention will be described with reference to FIG. 1.

Figure 5:
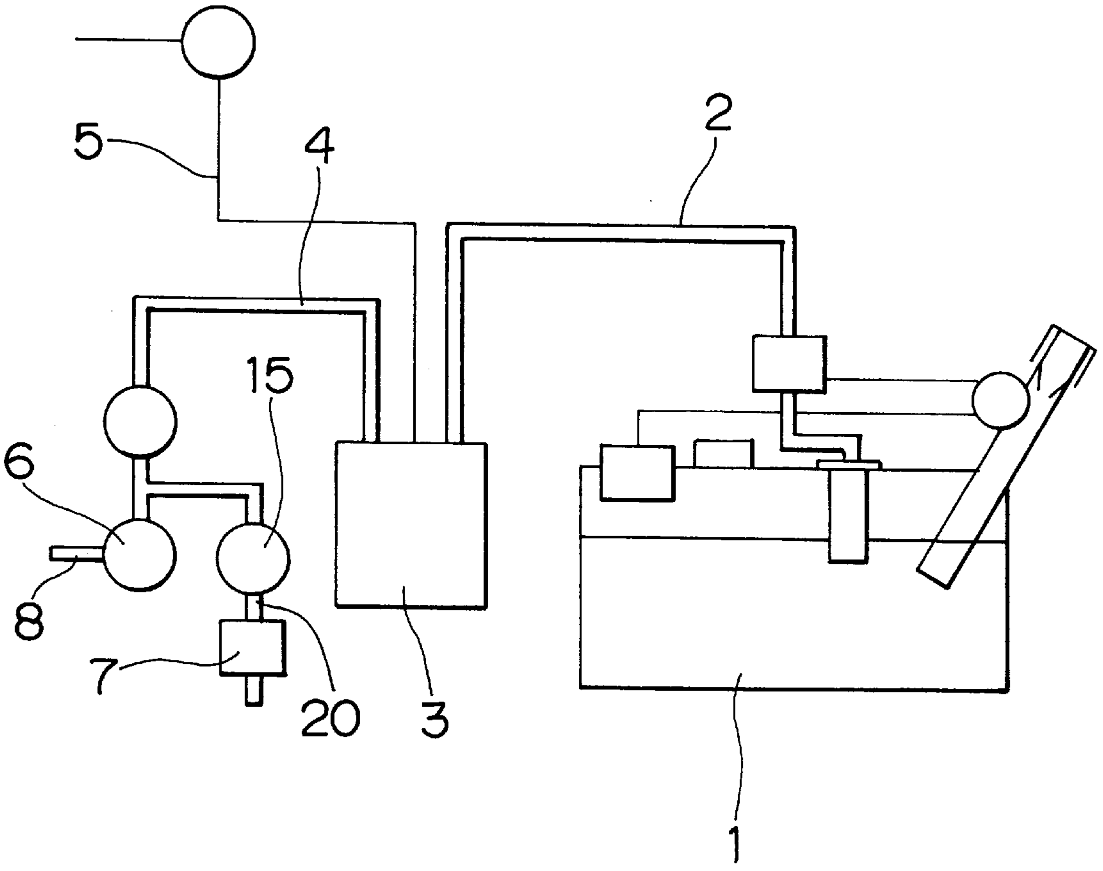
FIG. 5 RELATED ART
FIG. 5 is a system diagram of a breathing mechanism of a fuel tank according to the related art.
Figure 6:
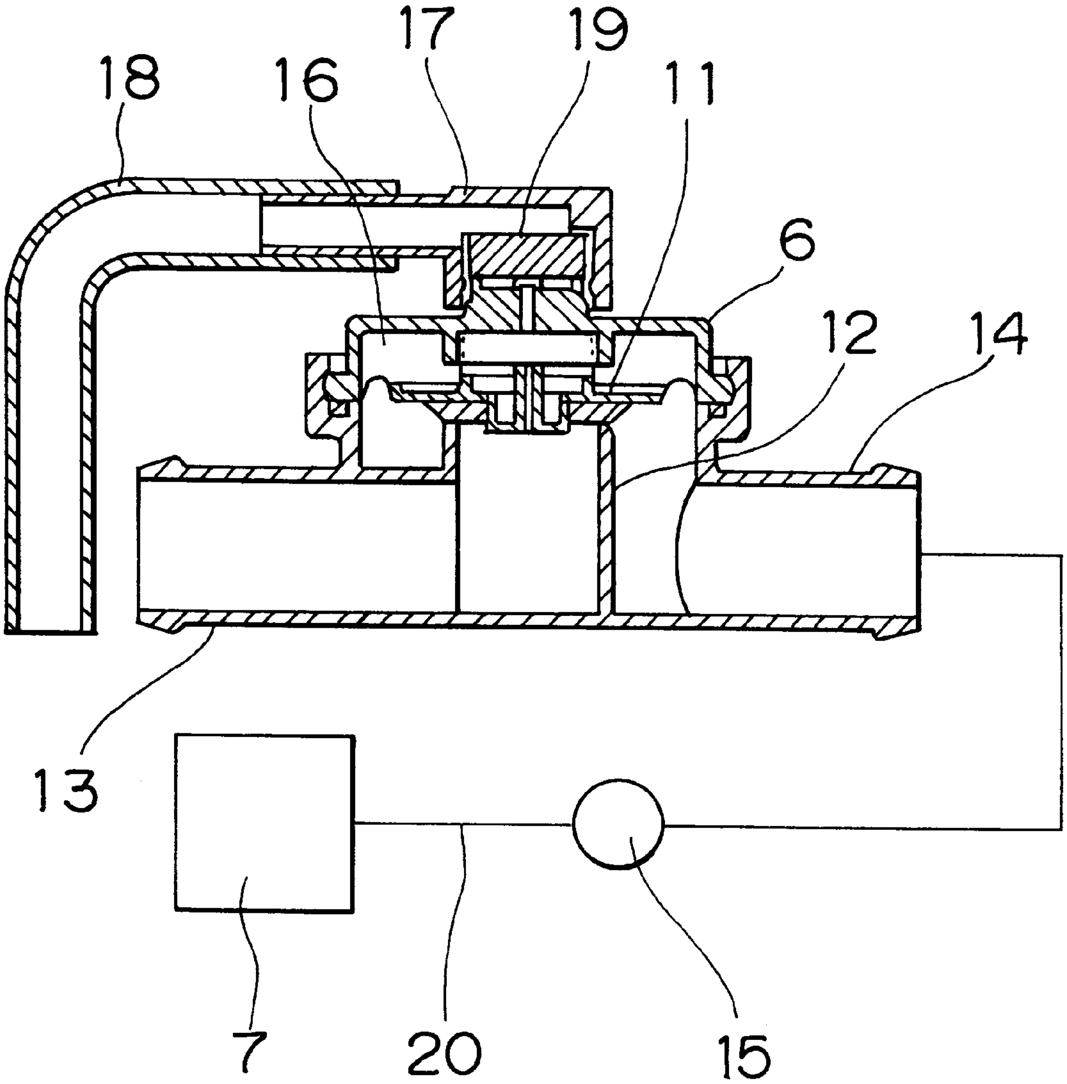
FIG. 6 RELATED ART
FIG. 6 is a cross-sectional view of a flow control valve according to the related art.

A flow control valve 100 of this embodiment has a diaphragm-type valve body 21 and a valve port 22 that is opened and closed by the valve body 21. In addition, the flow control valve 100 has a communication port 23 leading to the side of outside air and a communication port 24 leading to the side of a canister (see FIG. 5). The valve port 22 is formed at the end of the communication port 23 leading to the side of the atmosphere. If the valve port 22 is opened, the communication port 23 comes into communication with the communication port 24. An air filter 25 is connected to the communication port 23 and the communication port 24 through a box member 25A. The box member 25A is divided into a dust-side chamber 25B and a clean-side chamber 25C by the air filter 25. The dust-side chamber 25B communicates with the communication port 23 through a vent hole 26. The clean-side chamber 25C communicates with the communication port 24 through a vent hole 27. A lower lid of the box member 25A may be easily removed by means of a snap-fitting joint 28 for the purpose of facilitating exchange of the air filter 25, or may be securely fixed for example by welding.

A back pressure chamber 29 of the diaphragm-type valve body 21 communicates with the communication port 23 through a vent hole 31 formed in a case 30 of the flow control valve 100. Thereby the back pressure chamber 29 comes into communication with outside air, becomes capable of sucking and discharging air, and prevents water exposure.

In the flow control valve 100, if the pressure of fuel vapors in a fuel tank rises, the valve body 21 opens the valve port 22. Then the fuel vapors in the fuel tank enter the communication port 23 through a canister and the communication port 24 and are discharged to the outside.

In this case, since the flow resistance in the air filter 25 is great, the valve body 21 opens so that the fuel vapors at a raised pressure flow to the communication port 23 through the valve port 22.

If the pressure of the fuel vapors in the fuel tank falls, outside air reaches the air filter 25 through the communication port 23 and the vent hole 26, and is introduced into the fuel tank through the vent hole 27, the communication port 24 and the canister.

In this manner, while air is sucked through the air filter 25 during a suction stroke, air is discharged through a diaphragm the valve body 21 and an air filter 25 during an exhaust stroke.

In addition, the back pressure chamber 29 of the diaphragm-type valve body 21 sucks and discharges air as the valve body 21 moves vertically. This achieves smooth operation of the valve body 21. By the operation of sucking and discharging air, outside air is introduced into the back pressure chamber 29 through the communication port 23 and the vent hole 31. In this case, since the vent hole 31 opens to the communication port 23, water exposure is prevented.

Further, since the vent hole 31 opens to the communication port 23, the back pressure chamber 29 is protected against dust even without a dust filter.

Figure 2:
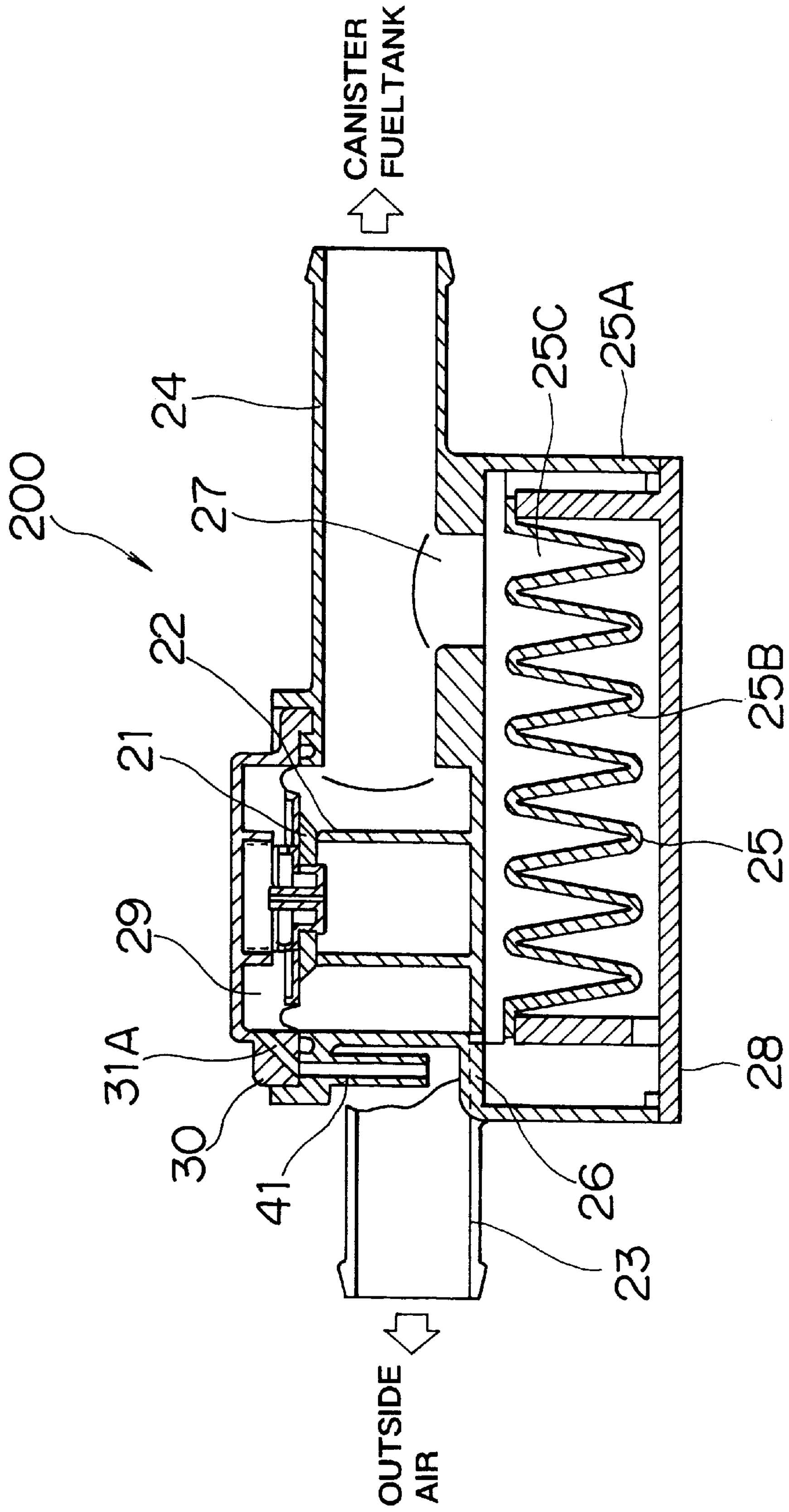
FIG. 2 is a cross-sectional view of a flow control valve according to a second embodiment of the invention.

FIG. 2 shows a second embodiment of the invention.

In the description of the following embodiments, components identical to those of the first embodiment will be denoted by the same reference numerals and will not be explained in any more detail.

In a flow control valve 200 of this embodiment, the vent hole 31A serving as a passage for sucking air into and discharging air from the back pressure chamber 29 is formed in the case 30, and an outside air communication port 41 that extends downwards from the case 30 is connected to the vent hole 31A.

According to this embodiment, since an air filter is integrated with the flow control valve, no restrictions are imposed on the installation space for the flow control valve.

Figure 3:
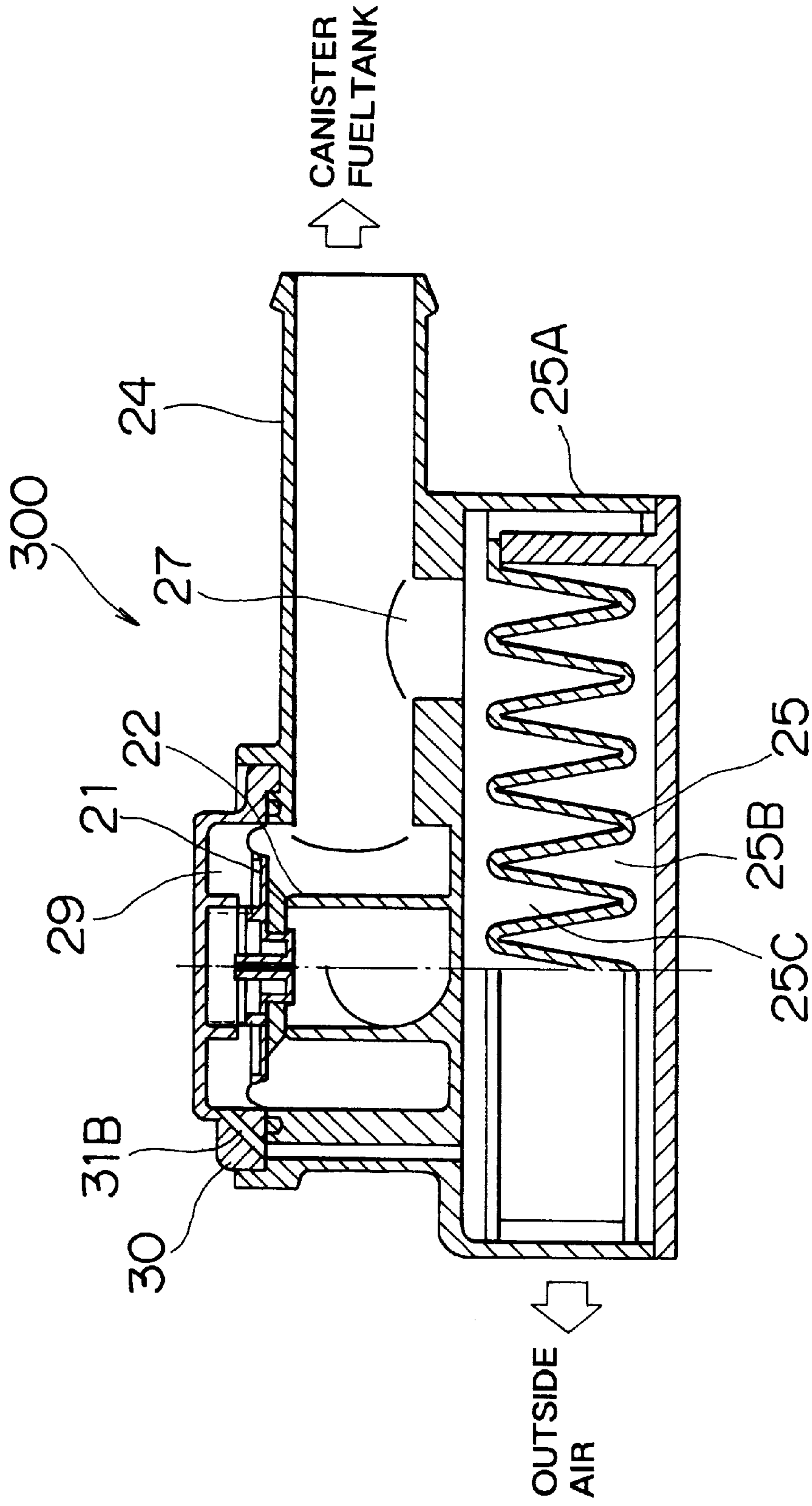
FIG. 3 is a cross-sectional view of a flow control valve according to a third embodiment of the invention.

FIG. 3 shows a third embodiment of the invention.

In this embodiment, a vent hole 31B serving as a passage for sucking air into and discharging air from the back pressure chamber 29 is formed in the case 30, and the vent hole 31B opens to the clean-side chamber 25C of the air filter 25.

According to this embodiment, since the air filter 25 also plays the role of a dust filter for the back pressure chamber 29, it becomes possible to cut down costs.

Figure 4:
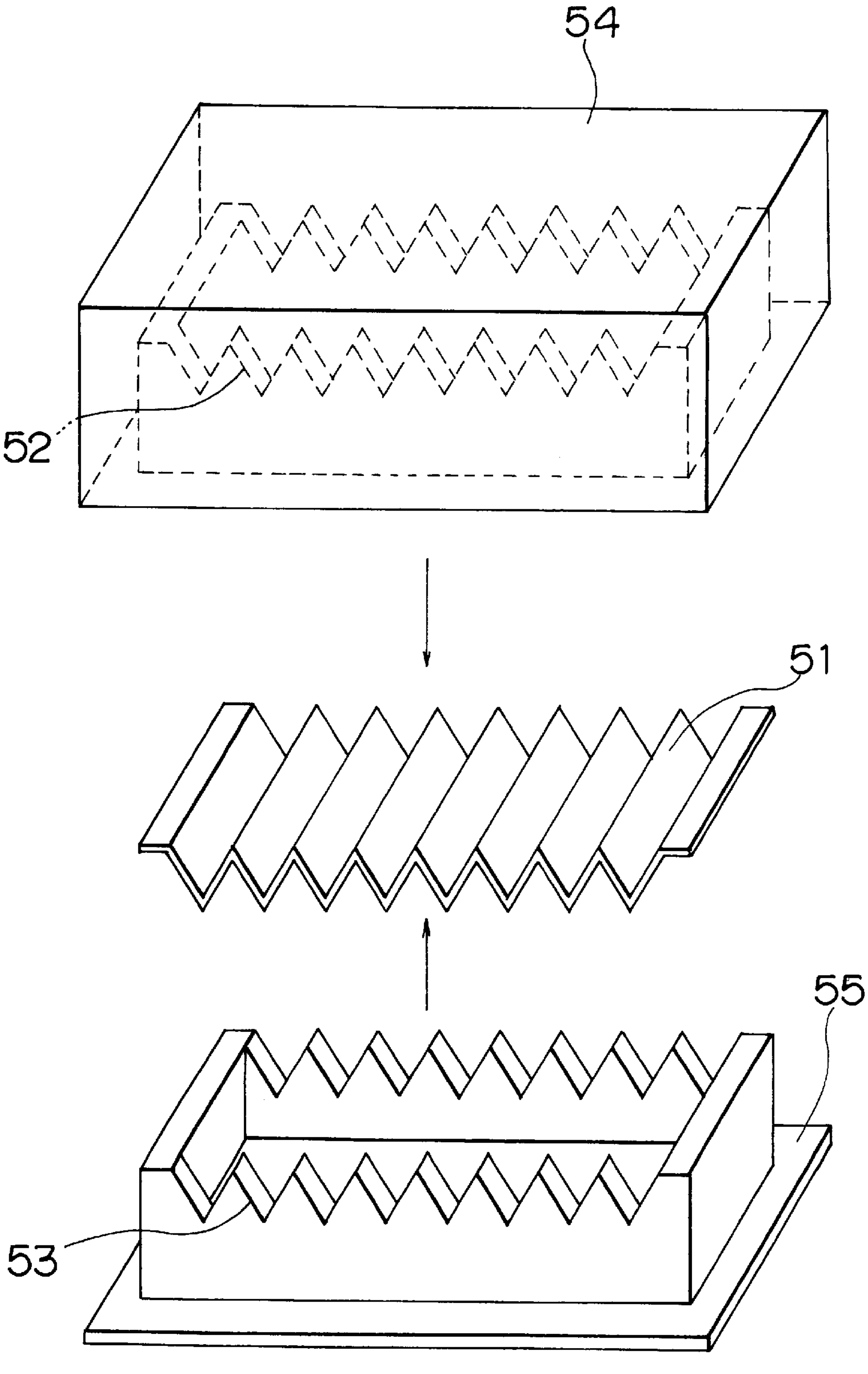
FIG. 4 is an exploded perspective view of an air filter employed in a flow control valve according to the invention.

FIG. 4 shows one exemplary manner in which the air filter 25 is mounted to the box member 25A in the aforementioned respective embodiments.

A sheet of filter paper 51 folded into a zigzag (e.g. undulate, trapezoidal, saw-toothed) shape to constitute the air filter 25 is sandwiched between a male die 52 and a female die 53, which have also been formed into a zigzag shape. The male die 52 and the female die 53 belong to a first box member 54 and a second box member 55 respectively. When the first box member 54 is covered by the second box member 55, the filter paper 51 is sandwiched between the male die 52 and the female die 53.

According to the foregoing description of the invention, since the air filter is integrated with the flow control valve, no restrictions are imposed on installation space. Also, the reduced number of parts makes it possible to cut down costs and reduce the height of the flow control valve.

While the invention has been described with reference to preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations which are exemplary, other combinations and configurations, including more, less or only a single embodiment, are also within the spirit and scope of the invention.

What is claimed is:

1. A flow control valve comprising:

a diaphragm-type valve body;

a valve port opened and closed by the valve body;

a first port;

a second port coming into communication with the first port when the valve body is opened;

a box member connected to the first port and the second port; and an air filter accommodated in the box member and dividing the box member into a first chamber and a second chamber, wherein the first chamber and the second chamber communicate with the first port and the second port respectively, and a back pressure chamber of the valve body communicates with the first port through a vent hole formed in a case of the flow control valve.

2. The flow control valve according to claim 1, wherein the first chamber is a dust-side chamber, and the second chamber is a clean-side chamber.

3. The flow control valve according to claim 2, further comprising:

a sheet of filter paper constituting the air filter, the sheet folded into a zigzag shape;

a male die corresponding in shape to the filter paper formed in a first portion of the box member; and a female die corresponding in shape to the filter paper formed in a second portion of the box member, wherein the filter paper is sandwiched between the male die and the female die.

4. The flow control valve according to claim 1, further comprising:

a sheet of filter paper constituting the air filter, the sheet folded into a zigzag shape;

a male die corresponding in shape to the filter paper formed in a first portion of the box member; and a female die corresponding in shape to the filter paper formed in a second portion of the box member, wherein the filter paper is sandwiched between the male die and the female die.

5. A flow control valve comprising:

a diaphragm-type valve body;

a valve port opened and closed by the valve body;

a first port;

a second port coming into communication with the first port when the valve body is opened;

a box member connected to the first port and the second port; and an air filter accommodated in the box member and dividing the box member into a first chamber and a second chamber, wherein the first chamber and the second chamber communicate with the first port and the second port respectively, and a back pressure chamber communicates with the second chamber through a vent hole formed in the case of the flow control valve.

6. The flow control valve according to claim 5, wherein the first chamber is a dust-side chamber, and the second chamber is a clean-side chamber.

7. The flow control valve according to claim 6, further comprising:

a sheet of filter paper constituting the air filter, the sheet folded into a zigzag shape;

a male die corresponding in shape to the filter paper formed in a first portion of the box member; and a female die corresponding in shape to the filter paper formed in a second portion of the box member, wherein the filter paper is sandwiched between the male die and the female die.

8. The flow control valve according to claim 5, further comprising:

a sheet of filter paper constituting the air filter, the sheet folded into a zigzag shape;

a male die corresponding in shape to the filter paper formed in a first portion of the box member; and a female die corresponding in shape to the filter paper formed in a second portion of the box member, wherein the filter paper is sandwiched between the male die and the female die.

9. A flow control valve comprising:

a diaphragm-type valve body;

a valve port opened and closed by the valve body;

a first port;

a second port coming into communication with the first port when the valve body is opened;

a box member connected to the first port and the second port; and an air filter accommodated in the box member and dividing the box member into a first chamber and a second chamber, wherein a back pressure chamber of the valve body communicates with outside air through a vent hole formed in a case of the flow control valve.

10. The flow control valve according to claim 9, wherein the first chamber is a dust-side chamber, and the second chamber is a clean-side chamber.

11. The flow control valve according to claim 10, further comprising:

a sheet of filter paper constituting the air filter, the sheet folded into a zigzag shape;

a male die corresponding in shape to the filter paper formed in a first portion of the box member; and a female die corresponding in shape to the filter paper formed in a second portion of the box member, wherein the filter paper is sandwiched between the male die and the female die.

12. The flow control valve according to claim 9, further comprising:

a sheet of filter paper constituting the air filter, the sheet folded into a zigzag shape;

a male die corresponding in shape to the filter paper formed in a first portion of the box member; and a female die corresponding in shape to the filter paper formed in a second portion of the box member, wherein the filter paper is sandwiched between the male die and the female die.

* * * * *